United States Patent [19]
Zikeli et al.

[11] Patent Number: 5,094,690
[45] Date of Patent: Mar. 10, 1992

[54] PROCESS AND ARRANGEMENT FOR PREPARING A SOLUTION OF CELLULOSE

[75] Inventors: Stefan Zikeli, Regau; Bernd Wolschner; Dieter Eichinger, both of Vöcklabruck; Raimund Jurkovic, Lenzing; Heinrich Firgo, Vöcklabruck, all of Austria

[73] Assignee: Lenzing Aktiengesellschaft, Lenzing, Austria

[21] Appl. No.: 742,093

[22] Filed: Aug. 2, 1991

Related U.S. Application Data

[63] Continuation of Ser. No. 389,499, Aug. 4, 1989, abandoned.

[30] Foreign Application Priority Data

Aug. 16, 1988 [AU] Australia .................. A2036/88

[51] Int. Cl.$^5$ .............................. C08J 3/11
[52] U.S. Cl. ................. 106/198; 106/163.1; 106/186
[58] Field of Search ............. 106/163.1, 170, 198, 106/186

[56] References Cited

U.S. PATENT DOCUMENTS

| | | | |
|---|---|---|---|
| 2,761,658 | 9/1956 | Magnusson | 106/197.2 |
| 3,695,327 | 10/1972 | Widmer. | |
| 4,145,532 | 3/1979 | Franks et al. | |
| 4,196,282 | 4/1980 | Franks et al. | |
| 4,246,221 | 1/1981 | McCorlsey. | |
| 4,321,106 | 3/1982 | Burkhard et al. | |
| 4,416,698 | 11/1983 | McCorlsey. | |
| 4,426,228 | 1/1984 | Brandner et al. | 106/163.1 |

FOREIGN PATENT DOCUMENTS

| | | |
|---|---|---|
| WO83/04415 | 12/1983 | PCT Int'l Appl. |
| 548432 | 3/1977 | U.S.S.R. |
| 803966 | 2/1981 | U.S.S.R. |
| 994587 | 7/1983 | U.S.S.R. |
| 994587A | 7/1983 | U.S.S.R. |
| 1058596 | 7/1983 | U.S.S.R. |
| 2001320 | 7/1977 | United Kingdom. |

OTHER PUBLICATIONS

Chanzy, H., "Cellulose-Amine Oxide Systems", Carbohydrate Plymers, 2 (4), (1982).
Chanzy, H. and Dubé, M., "Crystallization of Cellulose with N-Methylmorpholine N-Oxide; A New Method of Texturing Cellulose", J. Polymer Science: Polymers Letters Edition, 17, pp. 219-226, (1979).
Veroffentlicung von F. Strenk in "Chemie", pp. 61-63, (1975).
Parry et al., *Chemical Engineer's Handbook*, McGraw-Hill, New York, 5th Ed., pp. 19-14 thru 19-25.

*Primary Examiner*—Theodore Morris
*Assistant Examiner*—David M. Brunsman
*Attorney, Agent, or Firm*—Brumbaugh, Graves, Donohue & Raymond

[57] ABSTRACT

There is disclosed a process for preparing solutions of cellulose in aqueous tertiary amine oxides from a suspension of cellulose in an aqueous solution of the tertiary amine oxide by supplying heat at a reduced pressure. The suspension is transported over a heating surface, spread in layers or coats, until a homogenous solution of the cellulose has formed, which has a viscosity of between 50 and 15,000 Pas.s. Feeding of the suspension and drawing-off of the homogenous solution are carried out continuously. The solutions are prepared in an indirectly heated evacuatable vessel provided with a stirring device. The vessel is designed as a cylindrical container including a centrically mounted stirring shaft having agitators joined thereto, the radial distance of the agitators from the internal wall of the container being 20 mm at the most. There are provided an intake for the cellulose suspension in the upper part of the container and an outlet for the homogenous collulose solution in its lower end.

9 Claims, 1 Drawing Sheet

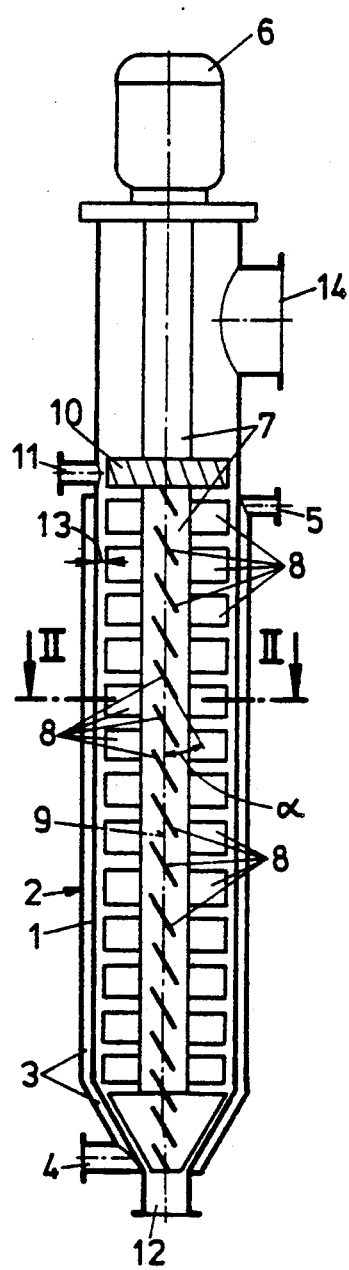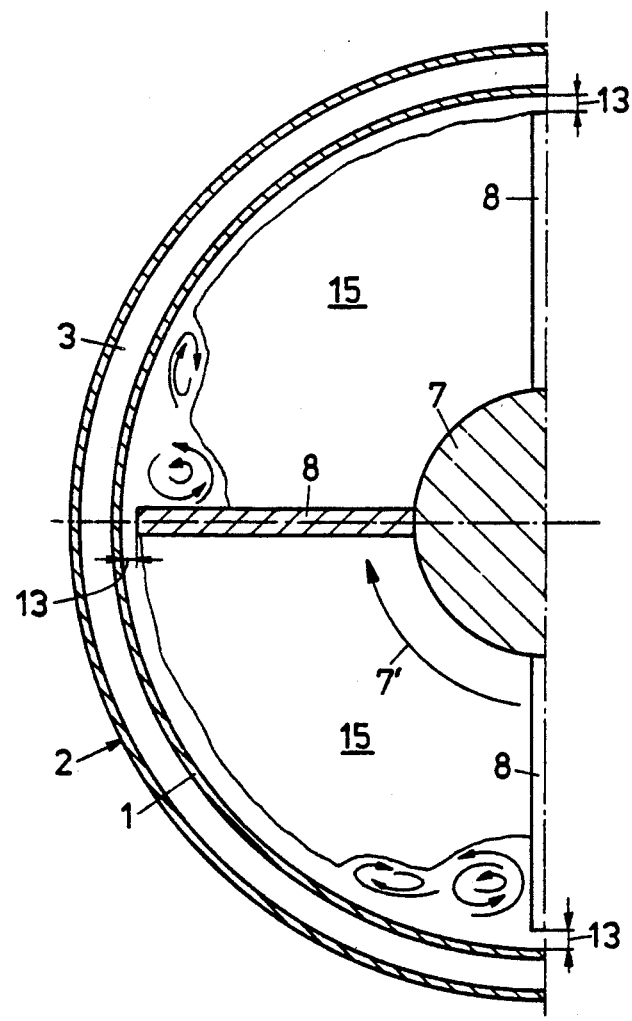

PROCESS AND ARRANGEMENT FOR PREPARING A SOLUTION OF CELLULOSE

This application is a continuation of application Ser. No. 389,499, filed on Aug. 4, 1989 now abandoned.

The invention relates to a process for preparing solutions of cellulose in aqueous tertiary amine oxides from a suspension of cellulose in an aqueous solution of the tertiary amine oxide by supplying heat at a reduced pressure, as well as to an arrangement for carrying out the process.

A process of this kind is described in PCT publication WO 83/04415. There, cellulose is suspended in an aqueous solution of a tertiary amine oxide containing up to 40% by mass of water and is heated to temperatures of between 90° and 120° C. under stirring. At the same time, the pressure is reduced to 80 to 150 mbar and water is drawn off until the cellulose dissolves. In this manner, spinnable solutions containing up to 15% by mass of cellulose are producible.

By shaping these solutions in water films, threads or shaped parts based on cellulose are obtained, i.e., articles which, today, are produced according to the viscose method on a large scale. However, as regards environmental safety, spinnable solutions of cellulose in aqueous tertiary amine oxides have a decisive advantage over viscose: While the tertiary amine oxide is capable of being recovered during spinning and used again, $H_2S$, COS, $CS_2$ and colloidal sulfur form at the decomposition of viscose. These substances can be disposed of only at great expense.

Nevertheless, the above-mentioned process using tertiary amine oxides as solubilizing agents has not found general acceptance as it still involves a number of disadvantages.

Water can be drawn off a stirrer vessel only with difficulties on account of the unfavorable ratio of the liquid surface to the liquid volume, and this results in long residence times ranging between 2 and 4 hours in the stirrer vessel. During that time, the polymer cellulose chain is partially degraded, which is even further promoted by the elevated temperature. This partial degradation, in turn, adversely affects certain properties of the final products after the spinning process, such as, e.g., strength, elongation and loop strength. Furthermore, it is known that heating, in particular to more than 130° C., may lead to a strong discoloration due to the decomposition of the amine oxide used. With some compounds, such as, e.g., N-methyl morpholine N-oxide, this degradation may cause an explosion due to vigorous gas development, the amount of the solutions present in the stirrer vessel thereby constituting a safety risk.

When carrying out the process on a large scale, one would, therefore, have to operate under adequate safety conditions with high pressure autoclaves if stirrer vessels were used. The use of such autoclaves under continuous operation for conditions is economically impractical. On the other hand, in the absence of safety means, only discontinuous operation of the stirrer vessel is possible. This renders the process rather inflexible, because it makes it more difficult to vary parameters, such as, e.g., the temperature and the evaporation rate. In addition, due to the high viscosity of the cellulose solutions, much of the spinning mass is retained by the stirrer vessel, thereby impairing the cleaning of the vessel and further reducing the economy of the process.

The invention has as its object to eliminate the above disadvantages and to provide a process for producing cellulose solutions in aqueous tertiary amine oxides, which can operate continuously and wherein the heat treatment of the suspension is performed over a substantially shorter period of time in order to minimize the thermal load on the cellulose and the tertiary amine oxide. Moreover, the safety risk inherent in the prior art is avoided. The invention, furthermore, seeks to provide an arrangement for carrying out the process, which does not have the disadvantages connected with stirrer vessels and high-pressure autoclaves.

In accordance with the invention, this object is achieved in that the suspension is transported over a heating surface, spread in layers or coats, until a homogenous solution of the cellulose has formed, which has a viscosity of between 50 and 15,000 Pas.s. Feeding of the suspension and drawing-off of the homogenous solution can be carried out continuously.

The spreading of the cellulose suspension in layers or coats over the heating surface results in a large liquid surface, which facilitates the removal of water. At the same time, rapid heating of the suspension to the temperature required for the preparation of the solution is feasible. By being transported over the heating surface continuous mixing of the suspension is ensured, which further promotes the heat and substance exchanges.

To adjust the viscosity of the solution, which is measured in the relative system, and to influence the swelling behavior of the cellulose within the suspension, a diluent, e.g., ethanol, may be added to the suspension.

Particularly good mixing is ensured if the layer spread over the heating surface has a thickness of not more than 20 mm, preferably 1.5 to 5 mm.

Advantageously, N-methyl morpholine N-oxide is used as the tertiary amine oxide, and is preferably in an aqueous solution containing 40% by mass of water.

A preferred embodiment of the process according to the invention is characterized in that the suspension is brought to a temperature of 50° to 150° C., preferably of 60° to 100° C., and is subjected to a pressure of from 0.5 mbar to 1,000 mbar, preferably 50 mbar to 150 mbar.

Preferably the suspension is contacted with the heating surface for a period of from 1 min to 60 min. This period of time, is sufficient to produce a homogenous solution and, yet is short enough such that the decomposition of the tertiary amine oxide and the degradation of the cellulose are largely prevented.

A suitable arrangement for carrying out the process of the invention, comprises an indirectly heated evacuatable vessel provided with a stirring means, said vessel designed as a cylindrical container including a centrically mounted stirring shaft having agitators joined thereto, with the radial distance of the agitators from the internal wall of the container being not more than 20 mm and having an intake for the cellulose suspension in the upper part of the container and an outlet for the homogenous cellulose solution in its lower end.

An advantageous embodiment of the arrangement according to the invention comprises a distribution ring provided at the stirring shaft to spread the cellulose suspension as a layer or coat on the internal wall of the container.

To control the transportation of the cellulose suspension along the internal wall of the container, it is preferable that the agitators have an angle of inclination relative to the axis of the stirring shaft, which angle is adjustable in size.

The process according to the invention to be performed with the arrangement described above is extremely flexible with regard to varying operational parameters. Further, it involves a substantially lower safety risk as compared to the prior art, as no large amount of solvent is heated at once, but only a comparatively small amount is continuously heated due to the solvent being spread in layers over the heating surface.

BRIEF DESCRIPTION OF THE DRAWINGS

The arrangement according to the invention will now be explained in more detail with reference to FIGS. 1 and 2, wherein:

FIG. 1 is a partial longitudinal section through the arrangement according to the invention, and FIG. 2 illustrates a section along line II—II of FIG. 1 on an enlarged scale.

In the drawings FIG. 1 denotes the internal wall of a preferably upright rotational body, which, in the exemplary embodiment illustrated, is designed as a container 2 cylindrical almost over its entire length. For the major part, the internal wall 1 is surrounded by a heating jacket 3 including connection means 4 and 5 for heating medium, the connection means 4 serving to supply, and the connection means 5 serving to discharge, the heating medium.

A stirring shaft 7 comprising agitators 8 joined thereto is centrically mounted within the container 2 and driven by a motor 6. The agitators 8, which are planar in the exemplary embodiment illustrated, extend radially to the axis, their plane making an angle of inclination alpha relative to the axis 9 of the stirring shaft 7, which angle preferably is adjustable in size. A distribution ring 10 is attached to the stirring shaft 7 above the agitators 8, spreading the cellulose suspension introduced through intake 11 on the internal wall 1 in layers. The distribution ring 10, thus, is provided at the level of the intake 11.

On its lower end, the container 2 is frustoconically tapered, including an outlet 12 for the homogenous cellulose solution. The agitators 8 have a constant radial distance 13 from the internal wall 1 of the container 2 over the total extension of the container 2, which distance is 20 mm at most.

On the upper part of the container 2, i.e., above the plane of the distribution ring 10, an opening 14 is provided for evacuating the container 2 and for drawing off water vapor.

The arrangement functions in the following manner:

The cellulose suspension—if desired in a preheated state—is continuously fed, through the intake 11, into the container 2 being under a reduced pressure, is seized there by the distribution ring 10, all of said suspension is spread on the internal wall 1 and is transported by the agitators 8, along the indirectly heated internal wall 1 serving as heating surface, to the outlet 12 on the lower end of the container 2. Heat carrier media, such as water, oil or vapor, are suited for indirect heating.

The cellulose suspension is heated during its transportation along the indirectly heated internal wall 1 and water simultaneously evaporates due to the reduced pressure, so that the tertiary amine oxide becomes concentrated until the cellulose dissolves.

FIG. 2 illustrates in detail how the cellulose suspension is processed in the container 2. It shows the stirring shaft 7 with agitators 8, the internal wall 1 and the heating jacket 3, a rotation direction of the stirring shaft 7 in the clock-wise direction having been assumed and illustrated by arrow 7'. The spreading in layers, respectively the thickness of the layer of cellulose suspension, is provided by the radial distance 13 of the agitators 8 from the heated internal wall 1. Bow waves of cellulose suspension, which are schematically illustrated in FIG. 2, are formed at the agitators by the rotational movement. As indicated in FIG. 2, the cellulose particles are circulated in these bow waves, which movement is translated to the suspension layer spread on the internal wall 1. Thereby, continuous rearrangement as well as intensive mixing of the suspension are safeguarded, substantially promoting the heat and substance exchanges.

It is decisive to the continuous control of the process according to the invention that the water vapor separated is drawn off in counterflow relative to the suspension transport. Moreover, it is important to the rapid drawing off of water vapor to provide for a sufficiently large exhaust vapor space 15, which is the case if the ratio of the length to the diameter of the cylindrical part of the container 2 amounts to between 4 and 8.

By means of the invention, it is possible to produce cellulose solutions containing up to 30% by mass of cellulose.

The invention will be explained in even more detail by the following examples:

EXAMPLE 1

A suspension of prehydrolysis sulfate cellulose (degree of polymerization about 1,400) in an aqueous solution of N-methyl morpholine N-oxide having a water content of 40% by mass was heated to 70° C. and continuously introduced into the arrangement according to the invention at an amount of 90 kg/h through intake 11. The content of prehydrolysis sulfate cellulose in the suspension was chosen such that a final concentration of cellulose of 10% by mass was obtained after evaporation of excess water.

The stirring shaft 7 was operated at a speed of 450 $min^{-1}$, the thickness of the layer spread over the internal wall being 15 mm. The indirectly heated internal wall 1 had a surface of 0.5 $m^2$ and was heated with heat carrier oil in a manner that a mean temperature difference of 83° C. resulted as a function of the heating up to the suspension (in counterflow relative to the heat carrier oil). In the exhaust vapor space 15, a pressure of 100 mbar was adjusted.

72 kg of homogenous cellulose solution per hour were obtainable at the outlet 12, which corresponds to a residence time of the suspension within the arrangement of the invention of 3 min. The solution was capable of being discharged in a degassed form. Its viscosity was 1,500 Pa.s (measured in the relative system). It was ascertained by microscopic assaying of the solution that no undissolved cellulose particles were present in the solution.

The exhaust vapors formed were drawn off in counterflow at a temperature of 70° C. and subsequently were condensed, the distillate stream being 29 kg per hour.

EXAMPLE 2

A suspension of ground prehydrolysis sulfate cellulose (degree of polymerization about 1,400) in an aqueous solution of N-methyl morpholine N-oxide having a water content of 40% by mass was heated to 80° C. and was continuously introduced into the arrangement of the invention through intake 11 at an amount of 90 kg/h. The content of prehydrolysis sulfate cellulose was chosen such that a final concentration of cellulose of 15% by mass was obtained after evaporation of excess water.

The stirring shaft 7 was operated at a speed of 450 min$^{-1}$, the thickness of the layer spread over the internal wall 1 amounting to 1.5 mm. The indirectly heated internal wall 1 had a surface of 0.5 m$^2$ and was heated with heat carrier oil in a manner that a mean temperature difference of 112° C. resulted as a function of the heating up of the suspension (in counterflow relative to the heat carrier oil). In the exhaust vapor space 15, a pressure of 150 mbar was adjusted.

64 kg of homogenous solution per hour were obtainable at the outlet 12, incurring in a degassed form. This mass flow corresponded to a residence time of 4 min.

The solution was obtained as a high-viscous mass (11,000 Pas.s, measured in the relative system), no undissolved cellulose particles being detectable under the microscope. The solution was directly supplied to a spinning machine and spun to cellulosic fibers.

The exhaust vapors formed were drawn off in counterflow at a temperature of 80° C. and subsequently were condensed, the distillate stream being 26 kg per hour.

What we claim is:

1. A process for preparing a solution of cellulose in aqueous tertiary amine oxide from a suspension of cellulose in an aqueous solution of said tertiary amine oxide by supplying heat at a reduced pressure, comprising the steps of
    providing an elongated heating surface having an input end and an output end,
    continuously supplying said suspension to the input end of said heating surface,
    mechanically spreading all of said suspension to form a coat or layer as it is supplied to said input end of said heating surface, said coat or layer having one surface in contact with the heating surface and an opposed surface which is exposed to reduced pressure, thereby enabling water to evaporate from said opposed surface,
    transporting said formed coat or layer of said suspension along said heating surface from said input end to said output end while simultaneously intensively mixing said suspension, and
    continuously discharging said homogeneous solution from the output end of said heating surface.

2. A process as in claim 1, wherein said layer spread on said heating surface has a thickness of not more than 20 mm.

3. A process as in claim 2, wherein said thickness is 1.5 to 5 mm.

4. A process as in claim 1, wherein N-methyl morpholine N-oxide is used as said tertiary amine oxide.

5. A process as in claim 4, wherein said N-methyl morpholine N-oxide is in an aqueous solution containing 40% by mass of water.

6. A process as in claim 1, wherein said suspension is brought to a temperature of between 50° and 150° C. and is subjected to a pressure of from 0.5 mbar to 1,000 mbar.

7. A process as in claim 6, wherein said suspension is brought to a temperature of between 60° and 100° C. and is subjected to a pressure of from 50 mbar to 150 mbar.

8. A process as in claim 1, wherein the period of transportation of said suspension over said heating surface 1 min to 60 min.

9. A process according to claim 1, wherein the heating surface is cylindrical in cross-section, the thickness of said layer being substantially less than the radius of said cylinder.

* * * * *

UNITED STATES PATENT AND TRADEMARK OFFICE
CERTIFICATE OF CORRECTION

PATENT NO. : 5,094,690
DATED : March 10, 1992
INVENTOR(S) : Zikeli et al.

It is certified that error appears in the above-identified patent and that said Letters Patent is hereby corrected as shown below:

Title page; Foreign Application Priority Data, item [30], delete "Australia" and substitute --Austria-- therefor.

Title page; Abstract, item [57], penultimate line, delete "collulose" and substitute --cellulose-- therefor.

Col. 1, line 59, delete "operation for" and substitute --operation-- therefor.

Col. 2, line 40, delete "preferably of" and substitute --preferably-- therefor.

Col. 2, line 45, delete "time," and substitute --time-- therefor.

Col. 4, line 44, delete "up to" and substitute --up of-- therefor.

Col. 6, line 32, delete "1 min" and substitute --is 1 min-- therefor.

Signed and Sealed this

Twelfth Day of July, 1994

Attest:

BRUCE LEHMAN

Attesting Officer     Commissioner of Patents and Trademarks